United States Patent [19]

Fenner et al.

[11] 4,203,623
[45] May 20, 1980

[54] BUS CONSTRUCTION

[75] Inventors: Hans Fenner, Evilard; Wilhelm Auwärter, Gümlingen; Karl-Heinz Stark, Muttenz, all of Switzerland

[73] Assignee: Ramseier & Jenzer AG, Carosseriewerke Bern, Bern, Switzerland

[21] Appl. No.: 838,988

[22] Filed: Oct. 3, 1977

[30] Foreign Application Priority Data

Apr. 7, 1977 [DE] Fed. Rep. of Germany ....... 2715550

[51] Int. Cl.² .................. B62D 31/02; B62D 47/02
[52] U.S. Cl. ................................................ 296/178
[58] Field of Search ............... 296/281 A, 177, 178, 296/179, 187, 188, 193, 202, 203

[56] References Cited

U.S. PATENT DOCUMENTS 3,802,530   4/1974   Purcell et al. ..................... 296/146

*Primary Examiner*—Richard A. Bertsch
*Attorney, Agent, or Firm*—Max Fogiel

[57] ABSTRACT

A bus construction in which a structure fastened to the chassis encloses the passenger area, and has sidewalls above the bottom of the vehicle, which are provided with a longitudinal carrier section. This section is interrupted only by door cutouts, and it connects to columns. The longitudinal carrier section is, furthermore, divided into a fixed supporting inside shell and a non-supporting easily replaceable outside shell used for covering. The supporting inside shell has a bottom arch section, and a hanger bar for the vehicle floor and for the wall-side seat fastening. The bottom arch section is staggered towards the inside, and a plate-like shell section with the two fixed supporting inside shell overlap in the vertical direction. The bottom arch section in the region overlapping the shell section is offset so that after connecting to the shell section, at least one tubular lengthwise cross-section appears. The bottom arch section and the shell section are joined underneath and above the tubular lengthwise cross-section by a substantially large number of partial welds.

15 Claims, 4 Drawing Figures

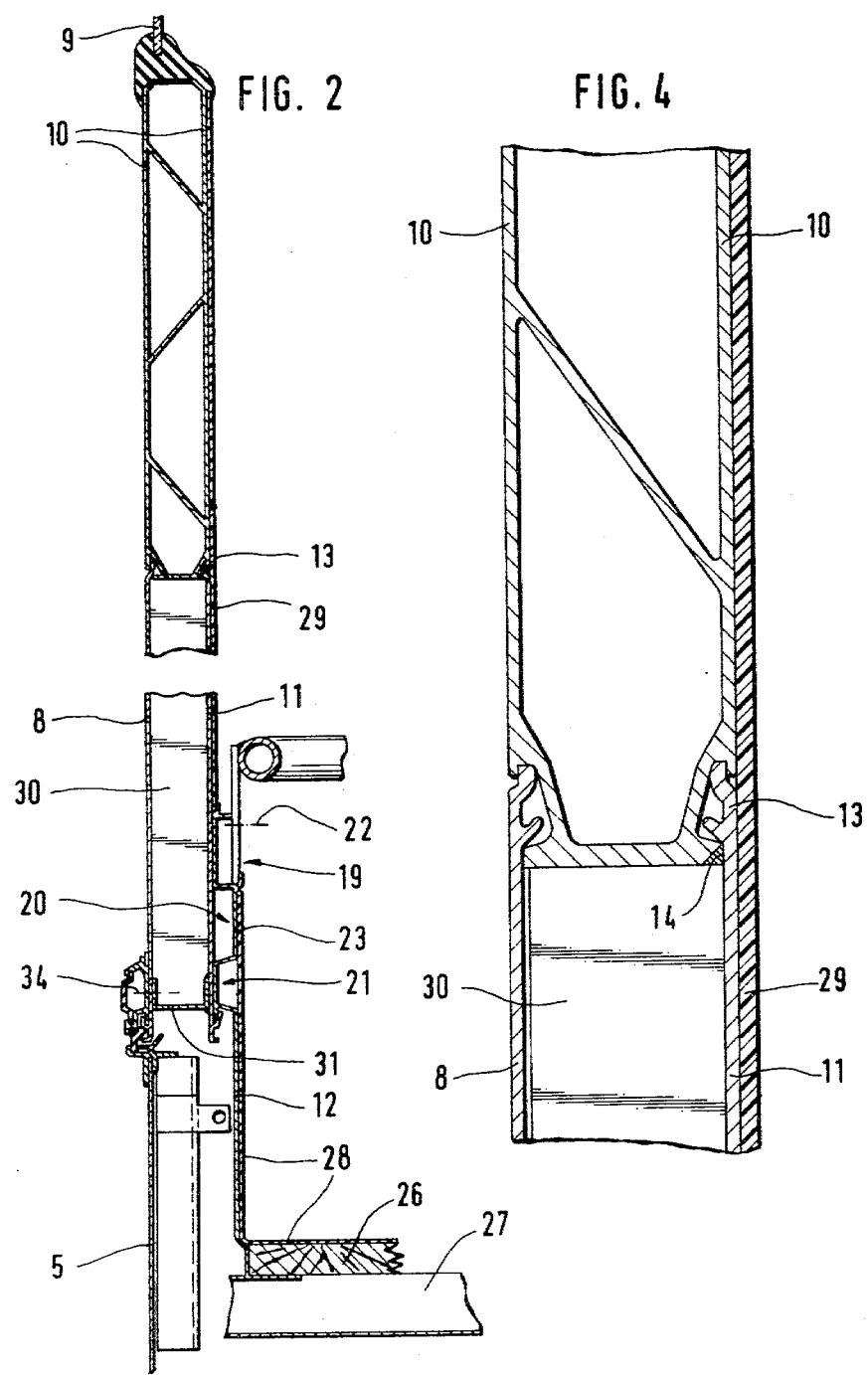

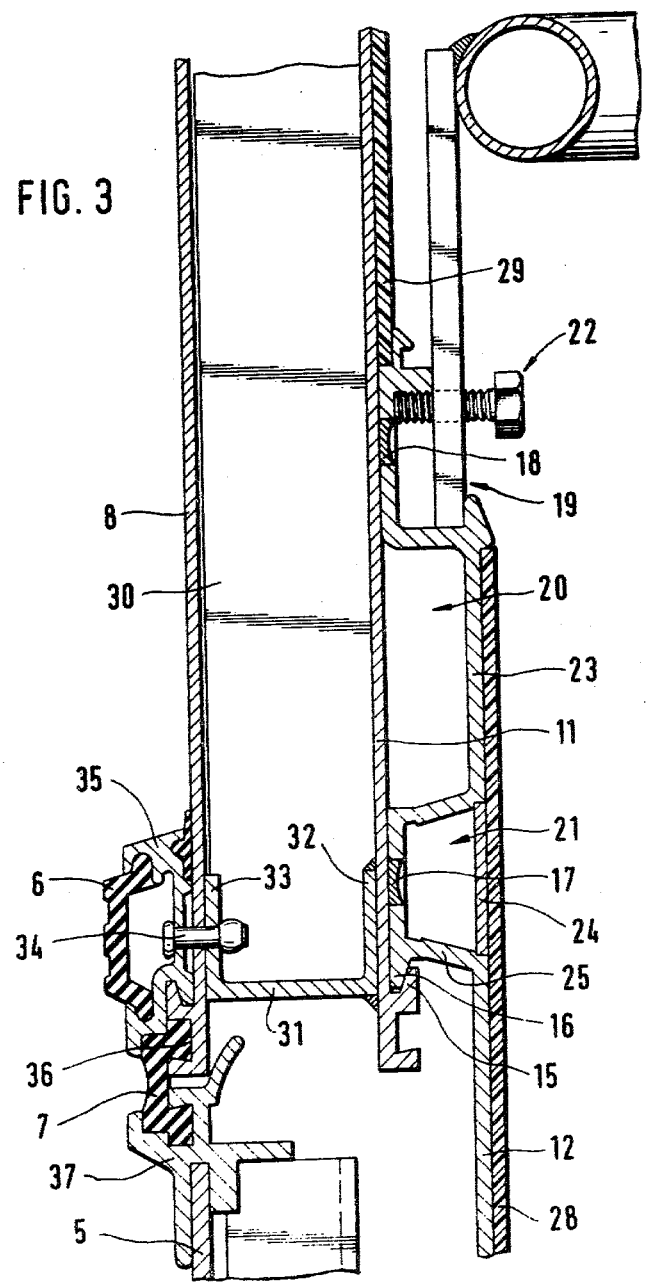

BUS CONSTRUCTION

BACKGROUND OF THE INVENTION

The present invention relates to a bus with chassis and a structure, fastened thereto, enclosing the passenger area; the sidewalls of this structure above the vehicle bottom have a longitudinal carrier section, interrupted only by door cutouts, which connects to columns.

For some time, in bus construction a skeleton construction welded from columns and beams has been used. This skeleton construction is then covered on both sides, i.e., inside and outside, using sheet metal, and also light weight sheet metal which is riveted or bonded to the skeleton structure. With this type of construction, it is important that the skeleton be made to close tolerance, since it is the supporting element. The space between the outer skin and the inner skin is frequently filled with rock wool or other insulating means. If such busses of skeleton construction are involved in traffic accidents, frequently not only the outer shell is bent and distorted, but also the skeleton structure. The repair of such a bus is extremely time consuming and expensive because even with relatively light accidents, the affected skeleton portions must be replaced and restored with close tolerance. In addition, at least the outer shell must be reinstalled.

There also is known a bus construction where the skeleton structure is only used partially. The rigidity is determined by a large-size pressed aluminum box section in the form of a longitudinal girder which is interrupted only by the door cutouts, has double walls and is reinforced like a framework structure (truss). The roof columns and the door frames are welded into this longitudinal girder. At the lower end region of this large-scale longitudinal girder, via rubber hinges, hinged lids are located which are below the girth line of the bus, identified by a ram strip, and can be replaced with relative ease after accidents. With accidents where damage occurs above the ram strip in the area of the large-scale lengthwise girder section, repair of the bus is possible only with considerable effort and with relatively large expense since here—as with skeleton construction—also the supporting parts may be distorted and must be replaced. Because of this defect, the girth line with this known bus construction can only be set relatively high.

It is, therefore, an object of the present invention to provide a bus whose construction is easily repaired and still has sufficient rigidity of structure. Also, the assembly time required for a structure is to be shortened by suitable design of the individual parts; this also applies to repairs and traffic accidents.

Another object of the present invention is to provide a bus construction of the foregoing character which may be produced at substantially low cost and which has a relatively long service life.

SUMMARY OF THE INVENTION

The objects of the present invention are achieved by providing that the longitudinal girder section is divided into a fixed, carrying inside whell and a non-carrying easily replaceable outside shell used for covering. The invention is based on the concept of realizing monocoque construction in such a way that only the inside shell is supporting while the outer shell serves for covering and hence can be easily replaced after accidents. The inner supporting shell is staggered (offset) as much as possible in the direction of the inside area so that this supporting shell is not damaged during frequent minor accidents. The invention can be applied up to the bottom edge of the windows in the sidewall. However, frequently this is not required. An additional center arch section can be placed under the windows, and this section can also provide support on the outside. This center arch section, however, already is at such a height that damages in traffic accidents are not expected or only in exceptional cases. This center arch can then be designed like a truss at with the known large-scale longitudinal girder or it may have a box section.

The supporting inner shell essentially comprises a bottom arch section having hanger bars for the vehicle floor and for the fastening of seats at the rim; this bottom arch section is staggered towards the inside, and a plate-like shell section is provided, with the two sections overlapping in the vertical direction. There is the possibility to pull the sidewall towards the inside in the area of the bottom arch section, or to use the space underneath the passenger seats without limiting the width of the passenger area at the seating level. In this area overlapping the shell section, the ground arch section is offset in the area overlapping the shell section in such a way that after connection to the shell section, at least a tube-like lengthwise cross-section develops. This overlapping connection is very important for rigidity because here, staggered inwards, there develops a box section or at least a tube-like lengthwise cross-section which is used for transfer of force. The bottom arch section and the shell section are connected underneath and above the tube-like lengthwise cross-section by a large number of partial welds, considerably increasing the rigidity of this assembly.

In a preferred embodiment, the ground arch section in the region overlapping the shell section is offset three times in opposite directions, with the outer offset being formed to attach the upper partial welds and to form the hanger bar for the rim-side seat fastening and open towards the passenger area, while the center offset forms the tube-like lengthwise cross-section and the lower offset—also open towards the inside—is designed for placing the lower partial welds. This results in several respects in a reinforcement of the inner shell section. The lower offset can be supplemented by a welded band section to form a second tube-like lengthwise cross-section further increasing the rigidity and torsion resistance of the structure.

The shell section in the lower end region has a hook-like rib while the ground arch section has a corresponding lug with which it is hung into the rib of the shell section. This facilitates the assembly when constructing the supporting inner shell, and makes possible precise alignment of the parts so that the partial welds can be located easily at the proper location. On the other hand, this construction does not establish the relative connection between the ground arch section and the inner shell section in the rear area of the bus where, for example, when using a below-floor-level rear motor, other relative positions between the two sections may be practical or required.

The outer shell, in the area of the shell section of the inner shell, essentially comprises a plate-like shell section which preferably has the same section as the shell section of the inner shell. These two shell sections are merely located symmetrically. The shell section for the inner and outer shell in the upper end region has a hang-in connection for joining to a supporting center arch section continuing to the outside. The center arch section can also be built with a very low height. This center arch section, considering its supporting function, belongs to the inside shell, and simultaneously forms an outside cover, but at a very high level where there are hardly any accidents.

The shell sections of the inside and outside shell are joined in the upper end region by the center arch section and in the lower end region by a leg section, bridging the intermediate space and being preferably U-shaped; one leg is welded to the inside shell and the other leg accommodates a rivet connection to the outside shell. This leg section is required to hold the outer shell free from noise and rattleproof. It is relatively easy to bend, and has really no supporting function as the inner shell. But it serves simultaneously for holding a rubber hinge for the hinged covers of the outer shell.

The shell section of the outer shell in the lower end region, has a frame for a rubber hinge which mount known hinged covers together with the one shell section for the easily interchanged outer shell. The outer shell which is not supporting thus has several elements on top of one another and extends beyond the girth line on the sidewall upward into a region where accidents occur relatively frequently. The rib of the outside shell section facing the outside has a base section carrying the ram strip; this base section is connected via easily disconnected rivet joints to the shell section of the outside shell and to the one leg of the leg section. The space for accommodating the shell section side bearing of the rubber hinge is a roughly rectangular or undercut recess which is covered and secured against the outside partly by the base section. This construction lends itself to easy repair. The rubber hinge can be pressed into the bearing on the shell section side, by applying a force perpendicular to the space extending in the lengthwise direction. This replaces the troublesome pulling-in of the rubber hinge in the lengthwise direction. On the other hand, a sufficiently solid seating of the rubber hinge is achieved, by partial coverage with the base section.

In the area between inner and outer shell, column trunks welded to the inner shell are provided at intervals; on the other end, they are connected to the cross-bars of the chassis. These column trunks support the inner shell forming the longitudinal girder. On this inner shell, in turn, the seat fastening and the floor ar hung. The column trunks end, with the exception of the door columns which continue beyond that level, at the center arch section.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 shows a section taken along line II—II in FIG. 1 through the sidewall underneath the window line;

FIG. 3 shows a detail of the sidewall according to FIG. 3 in the vicinity of the girth line; and FIG. 4 shows a detail of the sidewall at the transition from the inner and outer shell to the center arch section.

DESCRIPTION OF THE PREFERRED EMBODIMENTS

Figure 1:
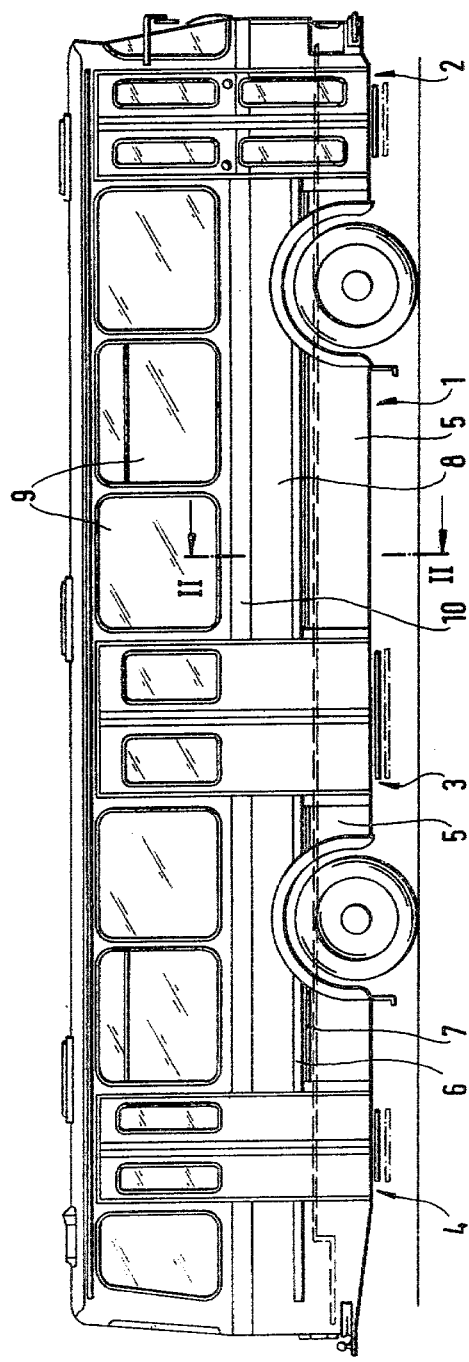
FIG. 1 shows a side view of the bus with the right-hand sidewall.

The bus shown in FIG. 1 has a right-hand sidewall as shown. This sidewall is interrupted by several doors 2, 3, 4. The left side wall of the bus is similar, but not interrupted. Hinged covers (lids) 5 terminate the sidewall at the bottom. Above these hinged lids 5 the ramming strip 6 and the rubber hinge 7 of the hinged lids is visible. The shell section 8 of the outside shell follows on top. Below the windows 9, a center arch section 10 may be provided.

FIG. 2 shows a schematic of the precise design of the sidewall in the area underneath the windows 9. As supporting element, an inner shell 11, 12 is provided; it comprises the shell section 11 and the ground arch section 12. The ground arch section is staggered rearward and overlaps the shell section 11 in a predetermined area. The shell section 11 is essentially a plane plate. This plane plate in its upper end has a hang-in connection 13 for connecting to the center arch section 10 which is shaped accordingly at this point. The shell section 11 is also connected to the center arch section 10 by welds 14. The center arch section 10 also, is among the parts which exercise a supporting function.

In the lower end region of the shell section 11 is a hook-like rib 15 in which a lug-like bead 16 of the bottom (ground) arch section 12 is hung. The two parts 15 and 16 serve mainly to facilitate easy assembly, i.e., the bottom arch section 12 is hung with the bead 16 into the rib 15 of the shell section 11. Then the lower partial weld 17 and the upper partial weld 18 are made. As is apparent from FIG. 3, the bottom arch section 12 in the overlapping region with the shell section 11 has three offsets, the upper offset 19, the center offset 20 and the lower offset 21. The upper offset 19 serves as hanger bar for the wall side seat fastening 22 and therefore is open in the direction of the passenger area. The center offset 20 after joining or placing the partial welds 17 and 18, forms a tube-like box section 23 which extends in the lengthwise direction and determines the rigidity and torsion resistance of the supporting inner shell. The lower offset 21 is open towards the passenger area so that the partial weld 17 can be made. A band section 24 can be welded in so that a second tube-like cross-section 25 develops which also increases the rigidity. The bottom arch section 12 at its lower end (FIG. 2) forms a hanger bar for the floor 26 and simultaneously rests on the cross bars 27 of the chassis. Also, the bottom arch section 12 has lugs and projections for attaching or locating a floor covering 28 and an inside cover 29 in the region of the shell section 11 and the center arch section 10.

In the area between the shell section 11 and the shell section 8, in the vertical direction, there are column trunks 30 which are connected only to the shell section 10 by welding and otherwise extending downward to the region of the hinged covers 5 where they are connected to the cross bars 27 of the chassis. These column trunks 30 can be arranged depending on the type of vehicle.

Between the inner carrying shell 11, 12 and the easily exchanged non-supporting outer shell 8, 5 a flexible leg section 31 is provided which may be U-shaped in cross-section. The inward facing leg 32 is welded to the shell section 11 while a rivet joint 34 is made to connect the outer shell section 8 to the leg 33. The rivet joint 34 may simultaneously or independently thereof fasten a base section which is used for inserting the ramming strip 6.

FIG. 3 indicates that the inner shell section 11 and the outer shell section 8 have the same section and are merely symmetrical. At the lower end of the shell section 8 is an area 36 for the shell section side location of the rubber hinge 7. This space 36 is slightly undercut but in such a way that with the base section 35 removed, the rubber hinge 7 can be pushed in with ease. Only by attaching the base section 35 does the rubber hinge 7 get its fixed solid seating in the shell section 8, by the partial coverage and securing on the outside. The rubber hinge 7, on the other hand, engages a linkage section 37 to which the hinged lid 5 is fastened which pivots about the rubber hinge 7 and assumes its proper position on the vehicle through gas operated springs (not shown).

It is evident how the supporting part, the inner shell comprises the shell section 8 and the bottom arch section 12, and how this supporting element is connected via the column trunks 30 to the cross bars 27 of the vehicle chassis. This inner shell 11, 12 lies at a protected position shifted toward the inside area. The outer shell, 8, 5 has only a covering function and can be easily replaced. The design of a sidewall is such that first the bottom arch section 12 is connected to the shell section 11. Then the column trunks and the leg sections 31 are welded to the shell section 11. After hanging the center arch section, by means of the hanging connection 13 and the weld 14, the shell section 8 is hung and at its lower end the hinged covers 5 are fastened via the rubber hinge 7. Then the base section 35 is fixed by means of the rivet joint 34 and the ramming strip 6 is inserted.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A bus with a chassis; a structure fastened to said chassis and enclosing the passenger area; said structure having sidewalls above the bottom of the bus and having a longitudinal carrier section, said sidewalls having door cutouts, said longitudinal carrier being interrupted only by the door cutouts, columns connecting to said longitudinal carrier, said longitudinal carrier section being divided into a fixed supporting inside shell and a non-supporting substantially replaceable outside shell, said outside shell comprising covering means; only said inside shell having a supporting function; said outside shell being replaceable; said inside shell and said outside shell comprising plate-shaped members; said outside shell being spaced and offset from said inside shell so that said inside shell is protected from damage in accidents involving the bus, said outside shell being replaceable after damage thereto without affecting the inside shell and remaining structure of the bus, disassembly of the outside shell being substantially independent of the remaining assembled structure.

2. A bus with a chassis; a structure fastened to said chassis and enclosing the passenger area; said structure having sidewalls above the bottom of the bus and having a longitudinal carrier section, said sidewalls having door cutouts, said longitudinal carrier being interrupted only by the door cutouts, columns connecting to said longitudinal carrier, said longitudinal carrier section being divided into a fixed supporting inside shell and a non-supporting substantially replaceable outside shell, said outside shell comprising covering means, said supporting inside shell comprising a bottom arch section and a hanger bar for the vehicle floor and for fastening wall-side seats, said bottom arch section being staggered towards the inside, and a plate-shaped shell section, said bottom arch section and said plate-shaped shell section overlapping in the vertical direction.

3. A bus construction as defined in claim 2 wherein said bottom arch section in the region overlapping said shell section is offset for exposing at least one tubular lengthwise cross-section after said bottom arch section is connected to said shell section.

4. A bus construction as defined in claim 3 wherein said bottom arch section and said shell section are joined underneath and above said tubular lengthwise cross-section by a substantially large number of partial welds.

5. A bus construction as defined in claim 4 wherein said bottom arch section in the region overlapping said shell section is offset alternately three times and has an upper offset formed to attach upper partial welds in place and to form said hanger bar for fastening wall-side seats, said upper offset being open towards the passenger area, said bottom arch section having a center offset forming said tubular lengthwise cross-section, said bottom arch section having a lower offset open towards the inside for placement of lower partial welds.

6. A bus construction as defined in claim 5 including a welded band section supplementing said lower offset for forming a second tubular lengthwise cross-section.

7. A bus construction as defined in claim 2 wherein said shell section has a lower end region with a hook-shaped rib, said bottom arch section having a lug-shaped bead for mating with said hook-shaped rib and hung in said rib of said shell section.

8. A bus construction as defined in claim 2 wherein said outside shell in the area of said shell section of said inside shell comprises a plate-shaped section having substantially the same section as said shell section of said inside shell.

9. A bus construction as defined in claim 8 including a supporting center arch section continuing to the outside, said shell sections of the inside and outside shell having an upper end region with a hang-in connection for connecting to said supporting center arch section.

10. A bus construction as defined in claim 9 including a U-shaped leg section, said shell sections of said inside and outside shell being joined at an upper end region by said center arch section and being joined at a lower end region by said U-shaped leg section, said leg section bridging a gap therebetween and having one leg welded to said inside shell and having the other leg forming a rivet joint with said outside shell.

11. A bus construction as defined in claim 8 including rubber hinge means mounting hinged covers, said plate-shaped shell section of said outside shell having a space in a lower end region for holding said rubber hinge means, said hinged covers together with said plate-shaped shell section forming the replaceable outside shell.

12. A bus construction as defined in claim 11 including rib means facing outside of said plate-shaped shell section of said outside shell, a base section carrying ramming strip means mounted on said rib means, disconnectable rivet joints connecting said ramming strip means to said plate-shaped shell section of said outside shell and to one leg of a U-shaped leg section joining said shell section of the inside and outside shell at a lower end region.

13. A bus construction as defined in claim 12 wherein said space for mounting said rubber hinge means on the shell section side is covered from the outside partially by said base section.

14. A bus construction as defined in claim 10 including spaced column trunks welded only to the inside shell in the space between the inside and outside shell, said column trunks being connected to cross bars of said chassis.

15. A bus construction as defined in claim 14 wherein at least some of said column trunks terminate at said center arch section, column trunks associated with doors continuing beyond said center arch section.

* * * * *